R. P. COLTON.
Rolled Metallic Bars.

No. 153,750. Patented Aug. 4, 1874.

WITNESSES:

INVENTOR:

ATTORNEYS.

UNITED STATES PATENT OFFICE.

REUBEN P. COLTON, OF GANANOQUE, CANADA.

IMPROVEMENT IN ROLLED METALLIC BARS.

Specification forming part of Letters Patent No. 153,750, dated August 4, 1874; application filed July 2, 1874.

*To all whom it may concern:*

Be it known that I, REUBEN P. COLTON, of Gananoque, in the county of Leeds, Province of Ontario, Dominion of Canada, have invented a new and useful improvement in Rolled Metallic Rods or Bars for use in making agricultural implements; and I do hereby declare that the following is a full, clear, and exact description of the same, reference being had to the accompanying drawing forming a part of this specification, in which—

Figure 1:
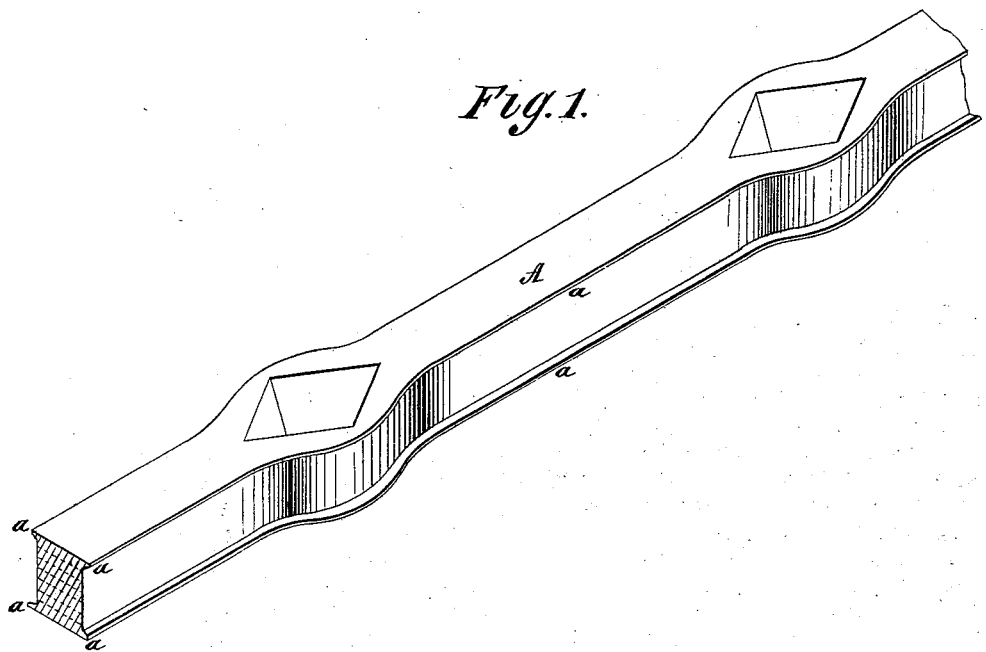
Figure 2:
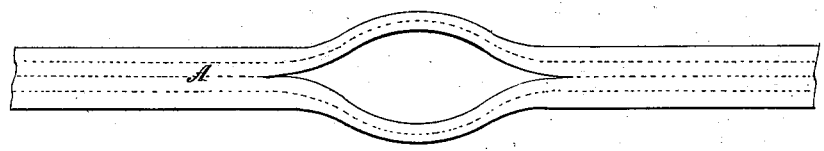

Figure 1 is a view of my improved rod or bar; and Fig. 2 a view of a rod punched in the line of piling, and rendered useless thereby.

The invention relates to the rods or bars made in rolling-mills for the use of manufacturers of agricultural and other implements: and consists in means whereby a great economy in the metal may be secured, all as hereinafter fully described.

A represents the rod or bar which is employed for making the cross-bars of harrows and analogous purposes. These are square, or very nearly so, from three-fourths to one and one-half inch in cross-section, and require to be punched by the implement-manufacturer, so as to receive the shank of the teeth, and sustain a very considerable strain. Hence, it is necessary that the punching shall be made across the line of piling, which would otherwise open, and the rod be rendered useless for the purpose.

In practice it is found very difficult for the punchers to discriminate the line of seam or lamination where the layers of piled metal conjoin; and, for this reason, many of the rods or bars (from eight to ten per cent.) are thrown aside as scrap. After the usual turnings of the rod or bar while undergoing the rolling operation in the mill, I cause the operator to run it between rolls so constructed as to cause one or more projecting flanges, $a$, parallel to the plane of piling, thus clearly indicating to the punchers on which side to perforate with their tools, while, at the same time, the bar is, to some extent, re-enforced and strengthened. This secures the implement-manufacturer against all loss through this source, and enables him to make each implement at a reduced cost.

Having thus described my invention, what I claim as new is—

As a new article of manufacture, iron rods or bars from three-fourths to one and one-half inch thick in cross-section, rolled from piles or fagots, and provided with edge-projecting ribs, parallel to the planes of piling, as shown and described.

The above specification of my invention signed by me this 24th day of June, A. D. 1874.

R. P. COLTON.

Witnesses:
SOLON C. KEMON,
CHAS. A. PETTIT.